Figure 6:
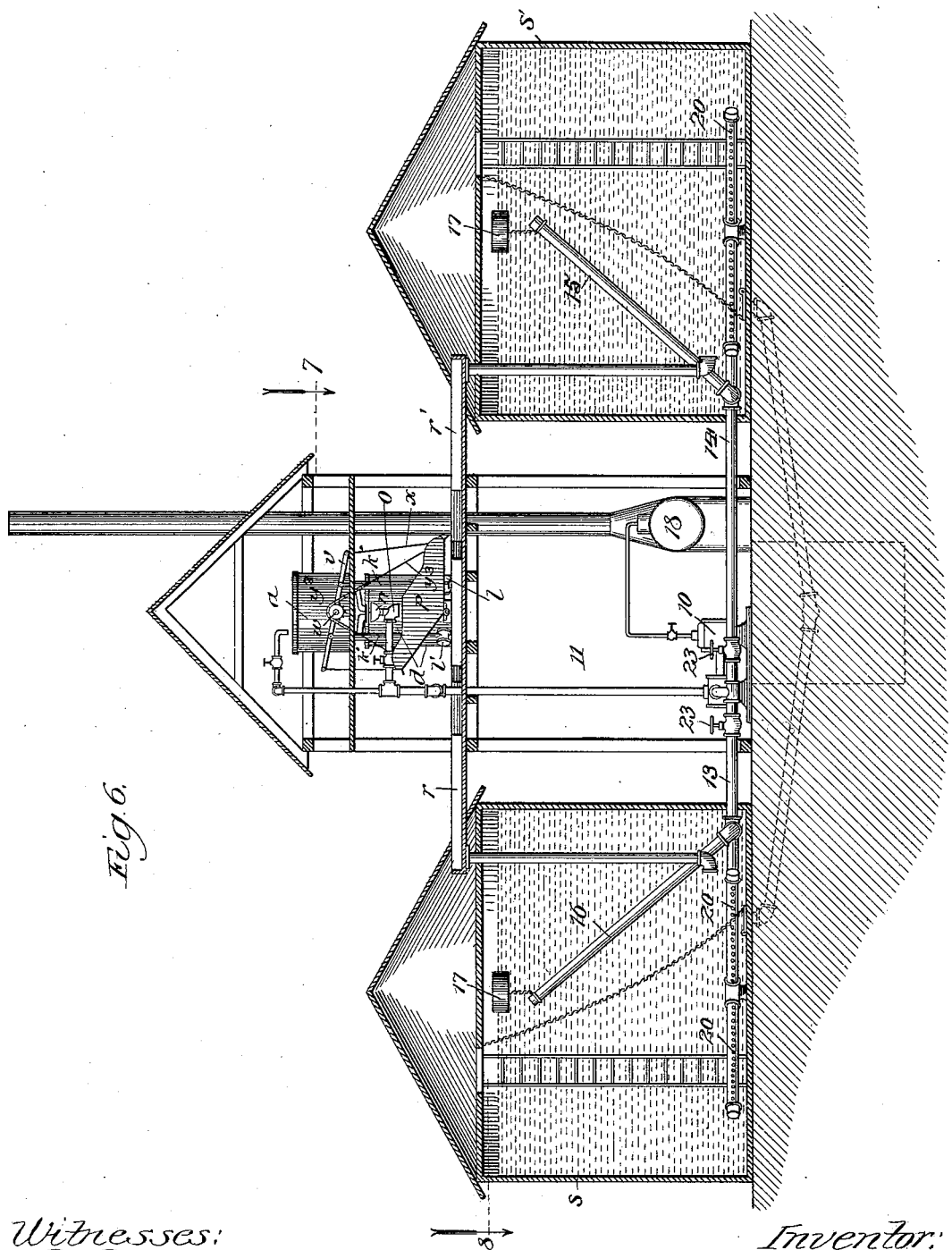

No. 712,771. Patented Nov. 4, 1902.
G. M. DAVIDSON.
WATER PURIFIER.
(Application filed July 2, 1902.)
(No Model.) 6 Sheets—Sheet 1.
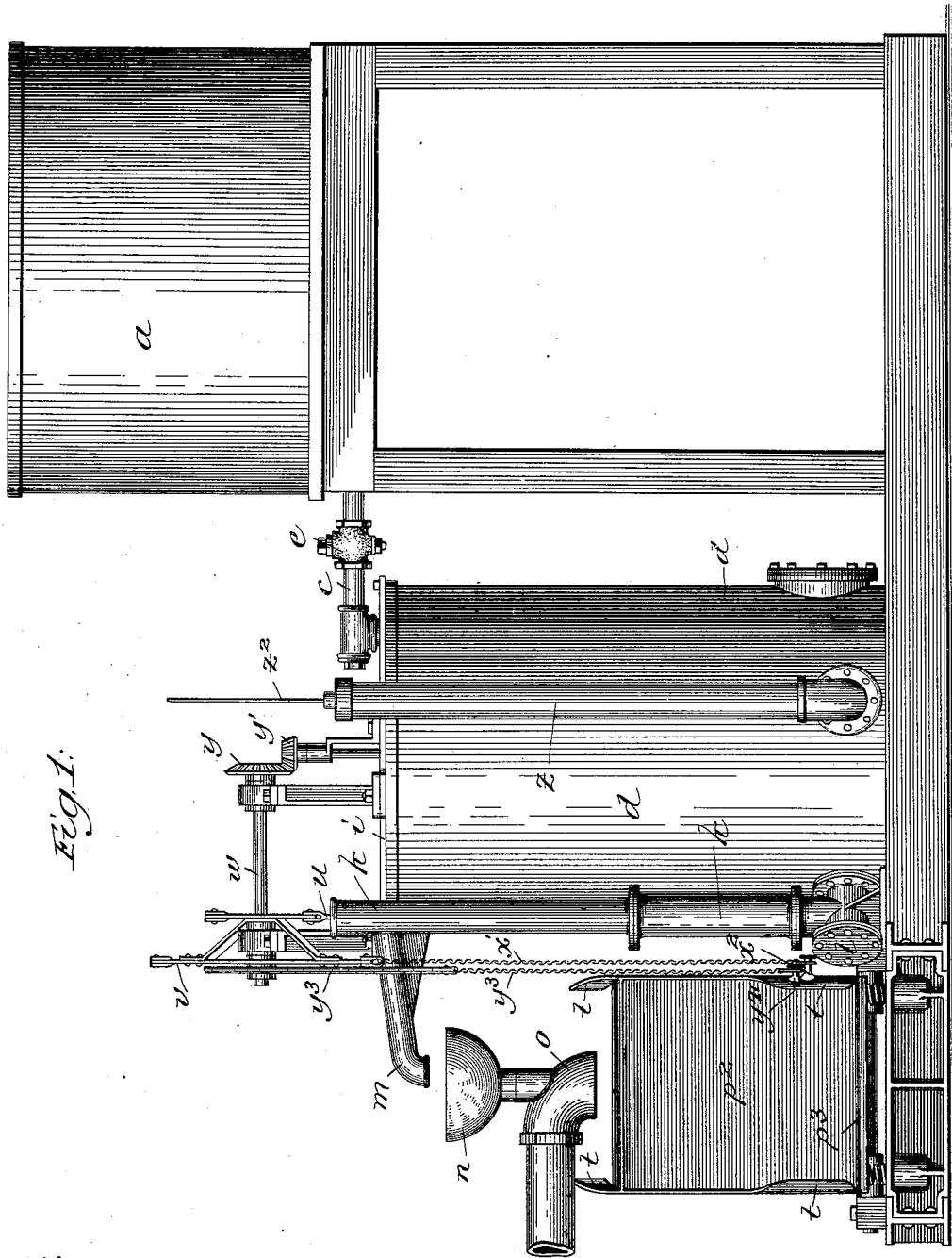
Witnesses:
Inventor:
George M. Davidson,
By Thomas F. Sheridan,
Atty.

No. 712,771. Patented Nov. 4, 1902.
G. M. DAVIDSON.
WATER PURIFIER.
(Application filed July 2, 1902.)
(No Model.) 6 Sheets—Sheet 2.
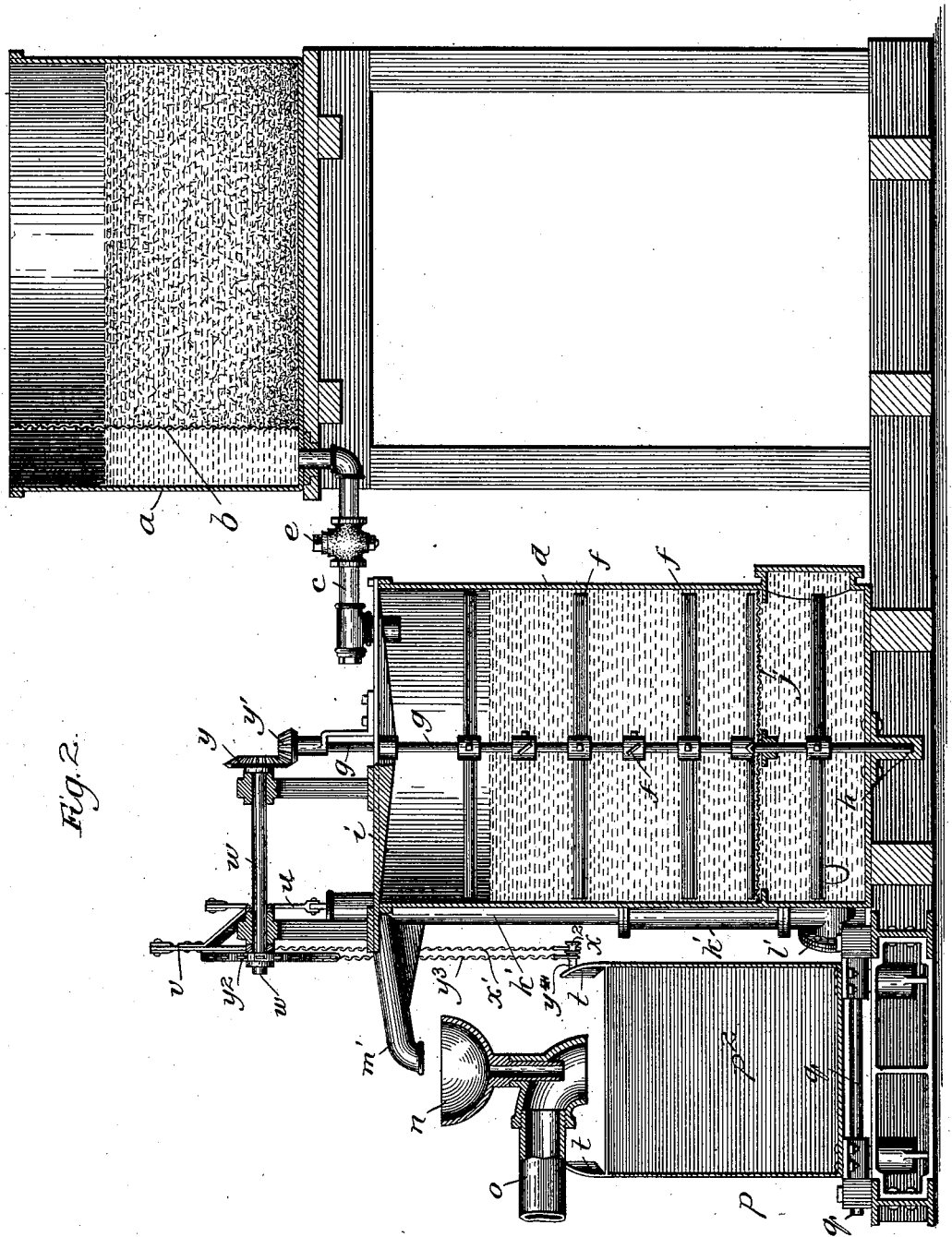
Witnesses:
Inventor:
George M. Davidson,
By Thomas F. Sheridan,
Att'y

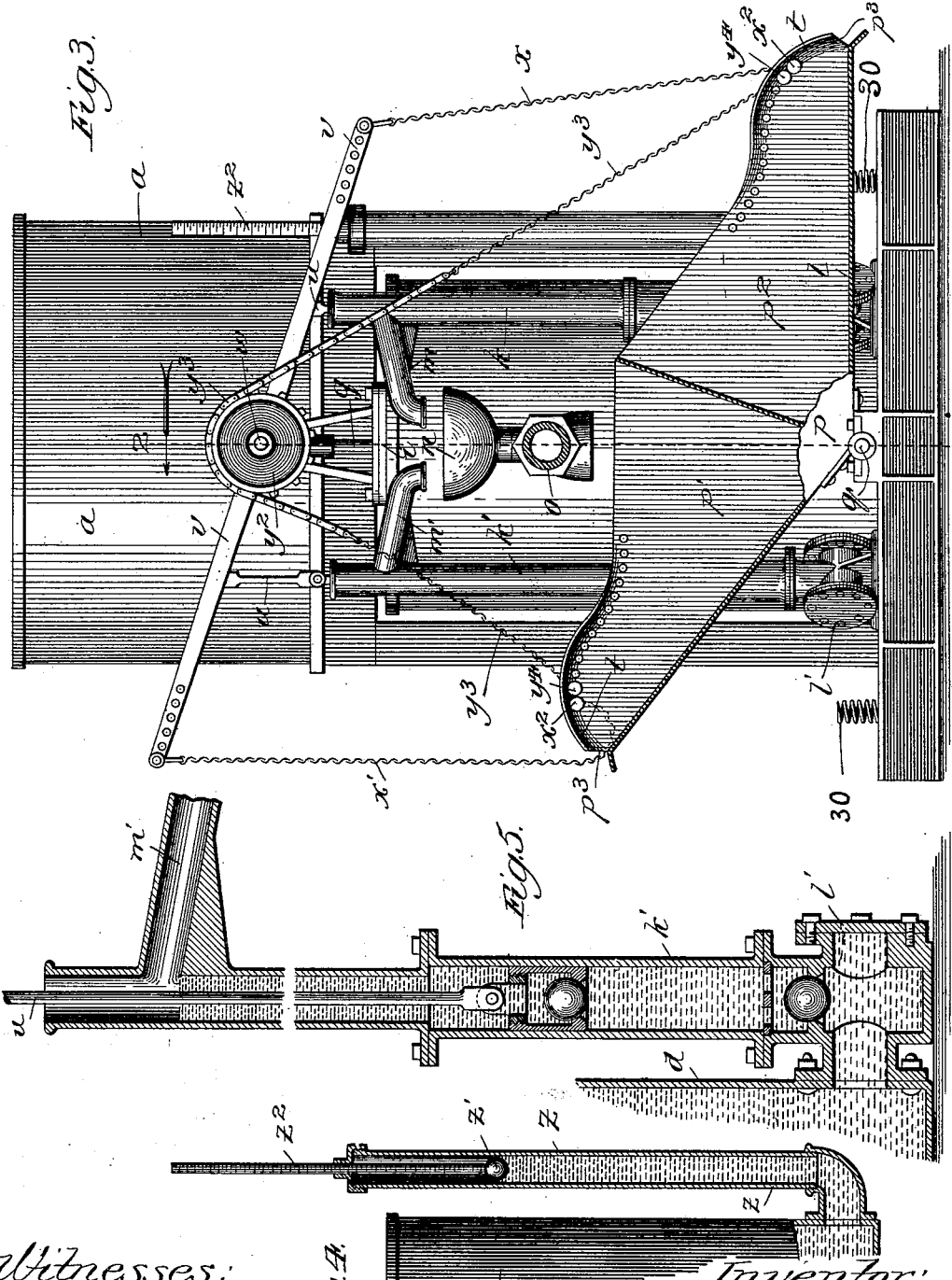

No. 712,771. Patented Nov. 4, 1902.
G. M. DAVIDSON.
WATER PURIFIER.
(Application filed July 2, 1902.)
(No Model.) 6 Sheets—Sheet 4.

Witnesses:
Inventor:
George M. Davidson,
By Thomas F. Sheridan,
Atty.

No. 712,771. Patented Nov. 4, 1902.
G. M. DAVIDSON.
WATER PURIFIER.
(Application filed July 2, 1902.)

(No Model.) 6 Sheets—Sheet 5.

Witnesses:
Chas. B. Gaylord,
John Enders Jr.

Inventor:
George M. Davidson,
By Thomas F. Sheridan,
Atty.

No. 712,771. Patented Nov. 4, 1902.
G. M. DAVIDSON.
WATER PURIFIER.
(Application filed July 2, 1902.)
(No Model.) 6 Sheets—Sheet 6.
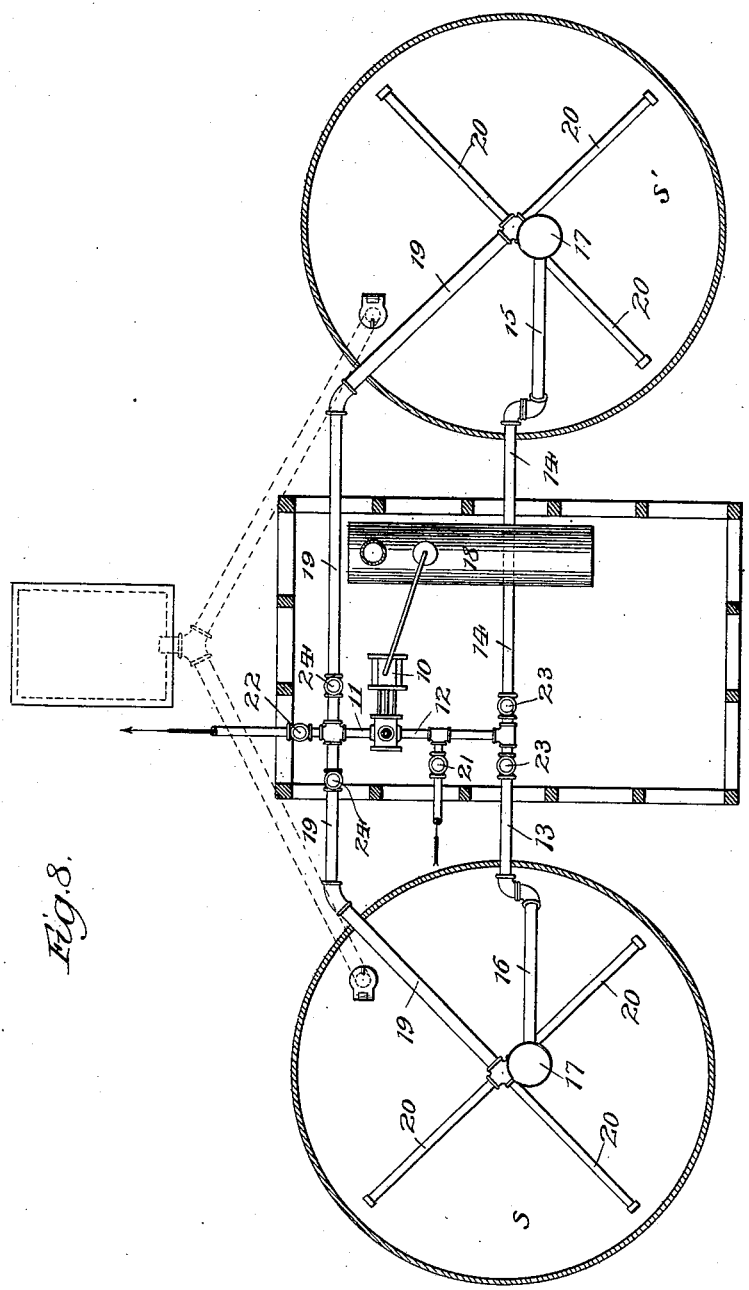
Witnesses:
Inventor:
George M. Davidson,
By Thomas F. Sheridan,
Atty.

UNITED STATES PATENT OFFICE.

GEORGE M. DAVIDSON, OF OAKPARK, ILLINOIS.

WATER-PURIFIER.

SPECIFICATION forming part of Letters Patent No. 712,771, dated November 4, 1902.

Application filed July 2, 1902. Serial No. 114,117. (No model.)

*To all whom it may concern:*

Be it known that I, GEORGE M. DAVIDSON, a citizen of the United States, residing at Oakpark, in the county of Cook and State of Illinois, have invented certain new and useful Improvements in Water-Purifiers, of which the following is a specification.

This invention relates to that class of mechanisms known as "water-purifiers"—that is, apparatus or mechanism arranged to mix predetermined quantities or proportions of chemicals with feed-water preliminary to the feeding of the same into a steam-boiler, so as to minimize as much as possible the deleterious actions of ordinary waters on the boiler-shell during the generation of steam, all of which will more fully hereinafter appear.

The principal object of the invention is to provide a simple, economical, and efficient water-purifier.

A further object is to provide a water-purifier with economical and efficient means for automatically operating the different mechanisms—such as the pumping, stirring, and feeding mechanisms.

Further objects of the invention will appear from an examination of the drawings and the following description and claims.

The invention consists principally in a chemical-feed tank, stirring mechanism movably mounted therein, pump mechanism secured thereto and connected with the chamber thereof, a water-supply pipe, and a tilting vessel arranged to receive the discharge of the water-supply and chemicals and connected with the operating mechanisms to operate the same by and during its movements.

The invention consists, further, in the combination of a chemical-feed tank, stirring mechanism in such feed-tank, a water-supply pipe, pump mechanism secured to the chemical-feed tank and connected therewith and provided with a discharging-spout arranged to discharge the chemicals into the water-supply pipe, and a tilting vessel provided with a plurality of measuring mixing-chambers arranged to receive the discharge of the mixed water and chemical supply and connected with the pump and stirring mechanisms to operate the same by and during its movements.

The invention consists, further and finally, in the features, combinations, and details of construction hereinafter described and claimed.

Figure 7:
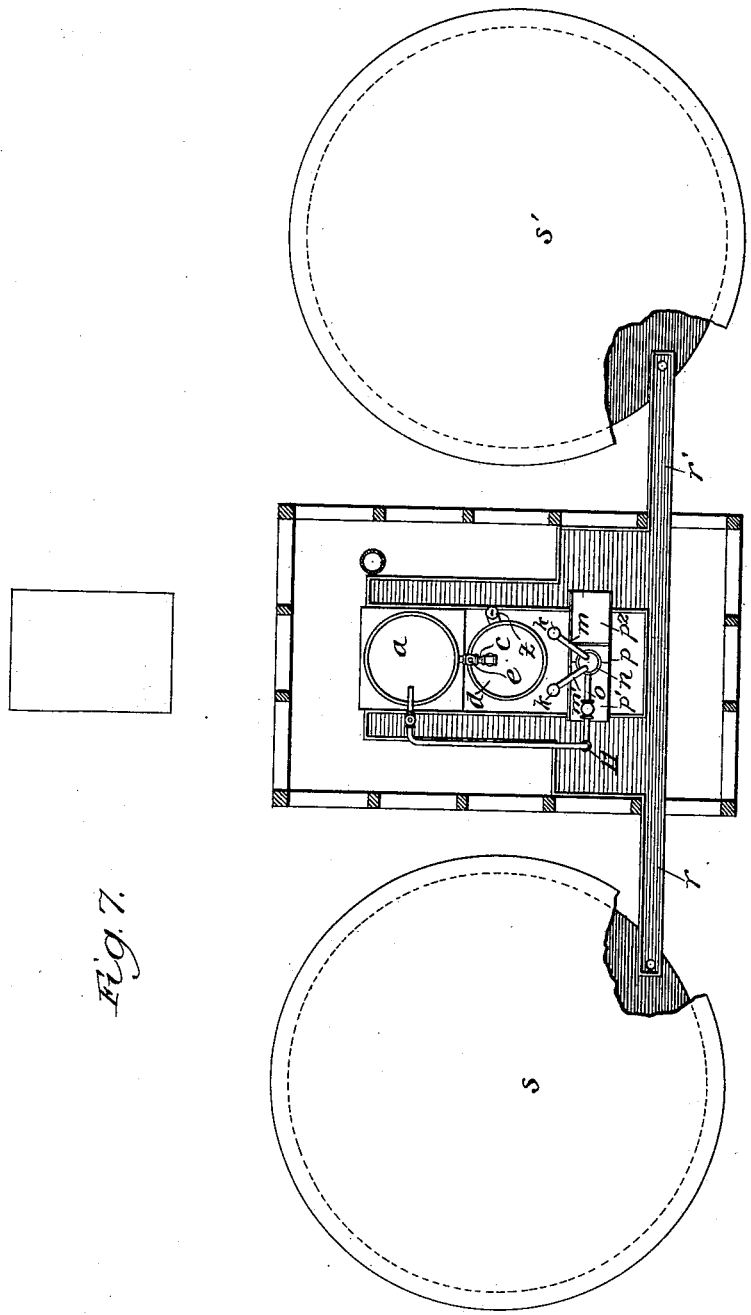

In the accompanying drawings, Figure 1 is a side elevation of the feed and mixing apparatus constructed in accordance with these improvements; Fig. 2, a vertical sectional elevation of the same, taken through the line 2 of Fig. 3 looking in the direction of the arrow; Fig. 3, a front elevation of the mechanisms looking at them from the left hand of Figs. 1 and 2; Fig. 4, an elevation, partly in section, of a portion of the mechanism and apparatus for showing the level of the liquids in the chemical-feed tank; Fig. 5, an enlarged vertical sectional elevation, taken through one of the pumps, showing its connection with the chemical-feed tank; Fig. 6, a sectional elevation of the building and entire apparatus for stirring, feeding, mixing, and storing the purified water, as hereinafter more fully described; Fig. 7, a plan sectional view of the same, taken on about line 7 of Fig. 6; and Fig. 8, a plan sectional view of the mechanism shown in Fig. 6, taken on line 8 and looking in the direction of the arrow.

In the art to which this invention relates it is well known that all natural boiler feed-waters contain more or less incrusting solid or other deleterious matter which if fed into the steam-boilers is during the generation of steam deposited in the form of scale on the inner surface thereof, all of which acts to incrust the flues and sheets, and thereby to lessen the efficiency of the boiler as well as resulting in extra consumption of fuel and decrease in the life of the boiler. It is also well known that a great many chemicals may be used and mixed with the feed-water before it enters the boiler to precipitate and remove said solids or other deleterious substances, so that the water when used will not have the objectionable actions above noted on the boiler.

The principal object, therefore, of this invention is to provide a suitable mixing apparatus, one which measures the chemicals and water in predetermined quantities and thoroughly mixes them before they enter a settling tank or tanks preliminary to being fed into the boiler, and means in the settling-tanks for thoroughly agitating the purified water and sediment therein, so as to obtain the best results, all of which will more fully hereinafter appear.

In constructing and arranging an apparatus in accordance with these improvements I provide a preliminary chemical-mixing tank $a$, of the desired size and shape, preferably cylindrical in contour, and place it in a vertical position, as shown particularly in Figs. 1 and 2 of the drawings. This preliminary chemical-mixing tank is, as above suggested, provided for the purpose of preliminarily mixing the chemicals with the desired quantity of water in order to primarily dissolve and mix them and is provided with a screen $b$, which acts as a strainer to separate the liquid from the coarse solid elements, so that the mixed chemicals and water may be drawn off through a pipe $c$, which I will hereinafter term the "chemical-supply pipe."

In order to thoroughly mix this chemical solution after it has been primarily dissolved or mixed with the requisite amount of water, a chemical mixing and feed tank $d$ is provided, which is made preferably in the shape of a cylinder vertically arranged and open at the top and into which the chemical-supply pipe $c$ discharges. This chemical-supply pipe, as shown in the drawings, is provided with a plug-valve $e$, which may be opened and closed whenever desired or necessary—that is, whenever it is desirable to supply the chemical mixing and feed tank with a fresh supply of chemicals the plug-valve is opened, and whenever it is necessary to shut off such supply the plug-valve is closed, all of which will be understood and appreciated by those conversant with the art.

To thoroughly mix and keep the chemical solution stirred and in condition for use in the chemical-feed tank above described, stirrers or beaters $f$ are arranged, mounted upon a vertical shaft $g$, in turn rotatably mounted in the axial center of such feed-tank. The lower part of this rotatable stirrer-shaft has a stepped bearing $h$ in the lower or bottom part of the chemical-feed tank, and the upper part is rotatably mounted in the cross-bar $i$ on the upper part of the tank. The lower part is separated from the upper part by means of a wire mesh or screen $j$, which serves to strain the liquid and keep the coarse solids above the same and also, as hereinafter set forth, to permit nothing but liquid or the finest solids from passing out of the tank.

In order to measure and feed the chemical solution so that it may be mixed with the requisite quantity of water-supply, the chemical-feed tank is provided with two pumps $k$ and $k'$, connected therewith at the lower portion through the instrumentality of the T's $l$ and $l'$. These pumps are provided at or near their upper portion with discharge-spouts $m$ and $m'$, which lead to and discharge into a funnel $n$, arranged on a water-supply pipe $o$ and connected with the discharge-spout thereof, so that just before the water passes out of such water-supply pipe the chemicals are fed therein in order to be thoroughly mixed with the water and in the requisite quantities. It is highly desirable that these quantities of chemicals and water be measured with some care and mixed in the required proportions in order to obtain the desired results, and also that it be done as economically as possible. To obtain this result, a tilting measuring vessel $p$ is provided and mounted upon a pivot $q$ directly under the discharge of the mixed water and chemicals, so that it may be tilted from side to side. This tilting and measuring vessel is provided with two chambers $p'$ and $p^2$, so that when it is in the position shown in Fig. 3 the mixed water and chemicals may flow into the chamber $p'$ until it is nearly filled. When such chamber is nearly filled, it counterbalances the weight of the other end of the tilting vessel, depresses it, and at the same time raises the other, so that the water may flow out through the discharge-opening $p^3$ of such chamber and into a trough $r$ at one side thereof, which trough leads to and deposits the mixed chemicals and water in a settling-tank $s$. The outer ends of each of these chambers are curved, as shown particularly in Fig. 3, so that as the water rises during the tilting action of the vessel it does not get a chance to flow over the sides. These ends are not only curved, but are also bent inwardly, as shown particularly in Fig. 1, so as to confine the water at the discharge-point into a consistent stream, and thereby prevent splashing.

While the chamber $p'$ is emptying the chamber $p^2$ is being filled, and when the latter is filled it in turn is depressed, returning the opposite end of the tilting vessel to the position shown in Fig. 3. These chambers are of a predetermined size, which is best reached by determining the quantities of water and chemicals that should be mixed, and during their tilting operations operate, by means of the mechanisms hereinafter described, the pumping and stirring mechanism, thereby feeding the desired amount of chemicals into the water-supply and during the operations of the vessel only. In order to operate the pumps during the tilting operations of the measuring vessel, the plungers $u$ of such pumps are connected to a walking-beam $v$, which is rotatably mounted on a shaft $w$. The ends of these walking-beams are connected by means of chains $x$ and $x'$ with studs $x^2$ on each end of the tilting vessel. An examination of the drawings, particularly Fig. 3 thereof, will show that when the parts are in the position shown in such figure and as the vessel is being tilted downwardly and to the left the pump $k$ is operated or the plunger thereof, so as to furnish a predetermined quantity of mixed chemical to the water-supply pipe. It will be understood that the water-supply is constantly running and that the pump is intermittently acted and only during the tilting operations of the tilting vessel. From this description of construction and operation it will be seen that a certain predetermined quantity of chemicals is fed to each side of the measuring vessel in proportion to the amount of other liquid which it will take to fill the same. In other words, the water-supply is constant and the tilting operations and chemical-supply intermittent.

It is desirable to provide means for automatically rotating the beater-shaft $g$. To accomplish this, the horizontal shaft $w$, above set forth, is provided with a bevel-gear $y$, meshing with a bevel-pinion $y'$ on the upper end of the beater-shaft. The outer end of the horizontal shaft is provided with a sprocket-wheel $y^2$, around which a chain $y^3$ passes, the ends of such chain being connected to studs $y^4$, secured to each end of the tilting vessel. By this construction and arrangement it will be seen that as the tilting vessel is operated it causes rotations of the beater-shaft and the beaters thereon, all of which serves to thoroughly agitate and assist in dissolving the chemicals in the chemical-feed tank. It is also desirable to have some means by which the level of the liquids in the chemical-feed tank may be determined easily. For this purpose a stand-pipe $z$ is secured to and connected with such chemical-tank. (See Figs. 3 and 4.) This stand-pipe is provided with a float $z'$, to which is secured a graduated pole $z^2$, which extends out through the upper end thereof, so that the operator may readily see the same and obtain the necessary information.

Buffer-springs 30 are used to lessen or absorb the shocks or jars due to the stopping of the tilting vessel at each limit of its motion.

As shown in Figs. 6 and 7, the mixed feed-water and chemicals are discharged into troughs $r$ and $r'$, one to the right and the other to the left of such figures, which conduct such liquids to the settling-tanks $s$ and $s'$. After these tanks are filled or partially filled with the mixture of chemicals and water it is desirable that the sediment from former mixtures be thoroughly agitated and mixed in the settling-tanks in order to hasten the settling of the new precipitate. To accomplish this result, a steam-pump 10 is provided, which is also used for furnishing a supply of water to the water-supply pipe $o$ by means of the pipe 11. (See Fig. 6.) This steam-pump has its inlet 12 connected to branch pipes 13 and 14, leading into each of the settling-tanks. These branch pipes have their outer ends 15 and 16 jointed to the main portions thereof, so as to be swiveled thereon. Floats 17 are secured to each of these inlet ends of the branch pipes 15 and 16 to maintain their inlet-openings at or near the upper level of the liquid. The discharge-pipe 11 of such pump is also connected with branches 19, which extend into each of the settling-tanks, and such branches are also connected to perforated pipes 20, which rest at or near the bottom of such tanks.

The operation is as follows: The valves 21 and 22 on the ordinary inlet and discharge pipes, which are used when the mixing apparatus above described are in operation, are closed, while the valves 23 and 24 on the inlet and outlet pipes just above described are opened. The pump is then supplied with steam from the boiler 18 and begins its operation, so that the mixed feed-water and chemical at or near the top of the settling-tank is drawn into the pump through the pipes 13, 14, 15, and 16 and forced into the bottom of the settling-tanks through the pipes 19 and 20, thereby maintaining a circulation of such liquid in such tanks. After the contents of the tanks have been agitated for a few minutes they are allowed to stand until the sediment has settled. The purified water is then drawn from the settling-tanks through the pipes 15 and 16, attached to the floats 17, and transferred to a suitable storage-tank, or it may be drawn direct from the settling-tanks to the boiler.

In order to discharge the purified water, valves 24 and inlet-valve 21 may be closed and valves 23 and discharge-valve 22 left open. The agitation of the liquid in the settling-tanks ceases while valve 24 is closed, allowing the sediment to settle to the bottom, and the floating or movable pipes then serve in the capacity of discharge-pipes for drawing off the purified water. During the intervals of agitation of the liquid and precipitates these movable pipes served, in connection with pipes 19 and 20, as means for producing the desired circulation and agitation. The intervals of agitation and tranquillity are therefore intermittent, and it will be readily apparent that the water drawn off during the intervals of complete tranquillity is as a result more completely free from sediment than it could possibly be if drawn off during the agitation, and it is also evident that the periods of agitation are necessary to quickly settle the sediment. The double capacity in which the floating pipes act is therefore a characteristic feature of this mode of operation, and the circulation of the liquid is through the movable pipe and pump to the perforated pipe at the bottom of the tank and through the liquid, making a complete continuous circuit during the desired intervals of time.

I claim—

1. In a water-purifier of the class described, the combination of a chemical-feed tank, stirring mechanism movably mounted therein, pump mechanism secured thereto, a water-supply pipe arranged to receive the chemical-supply as it passes from the pumps on the chemical-feed tank, and a tilting vessel arranged to receive the discharge of the mixed chemical and water supply and connected with the pumping mechanism to operate the same by and during its movements, substantially as described.

2. In a water-purifier of the class described, the combination of a chemical-feed tank, stirring mechanism movably mounted therein, pumping mechanism secured to such chemical-feed tank and connected therewith, a water-supply pipe arranged to receive chemicals as they are discharged from the pump, and a tilting liquid-measuring vessel connected with the pump and stirring mechanism to operate the same intermittently by and during its movements, substantially as described.

3. In a water-purifier of the class described, the combination of a chemical-feed tank provided with two reciprocating pumps connected therewith, beater mechanism rotatably mounted therein, a water-supply pipe arranged to receive the discharge from the two chemical-pumps, and a tilting vessel provided with a plurality of measuring-chambers arranged underneath the discharge-opening of the water-supply pipe and connected with the pumping and stirring mechanism to intermittently operate the same, substantially as described.

4. In a water-purifier of the class described, the combination of a chemical-mixing tank provided with rotatable stirrer and beater mechanism, two vertically-arranged reciprocating pumps connected with the bottom of such chemical-feed tank, a walking-beam to which is pivotally connected the plungers of the reciprocating pumps, a water-supply pipe arranged to receive the discharge from the chemical-pumps, and a tilting vessel provided with a plurality of measuring-chambers arranged under the discharge-opening of the water-supply pipe and connected with the walking-beam of the pump and with the stirring beating mechanism to intermittently operate the same, substantially as described.

5. In a water-purifier of the class described, the combination of a chemical-feed tank provided with rotatable stirrer and beater mechanism, two reciprocating pumps vertically arranged and connected with the bottom portion of such chemical-feed tank, gear mechanism connected with the beater mechanism, a horizontal shaft provided with a sprocket-wheel and gear mechanism connected with the gear mechanism of the stirrer and beater mechanism, a walking-beam pivotally connected with the plungers of the vertically-arranged chemical-pumps, a water-supply pipe arranged underneath so as to receive the chemicals as they are discharged from the chemical-pumps, and a tilting vessel provided with a plurality of measuring-chambers arranged under the discharge-opening of the water-supply pipe and connected with the walking-beam of the pump and the sprocket-wheel of the beater mechanism to intermittently operate the same, substantially as described.

6. In a water-purifier of the class described, a combination of means for measuring and mixing water and chemicals together, a settling-tank for receiving the mixed water and chemicals, a pump provided with an inlet-pipe and a discharge-pipe, pipe mechanism arranged in the bottom of the settling-tank and connected with the discharge-pipe of the pump, and pipe mechanism arranged in the settling-tank and connected with the inlet-pipe of the pump, substantially as described.

7. In a water-purifier of the class described, a combination of means for measuring and mixing water and chemicals together, a settling-tank for receiving the mixed water and chemicals, a pump provided with an inlet-pipe and a discharge-pipe, perforated pipe mechanism arranged in the bottom of the settling-tank and connected with the discharge-pipe of the pump, and pipe mechanism movably mounted in the settling-tank and connected with the inlet-pipe of the pump whereby circulation of liquid through the pivoted pipe and pump to the perforated pipes and through the liquid in the settling-tank may be produced, substantially as described.

8. In a water-purifier of the class described, the combination of means for measuring and mixing water and chemicals together, a settling-tank for receiving the mixed water and chemicals, a pump provided with an inlet-pipe and a discharge-pipe, a discharge-valve in such discharge-pipe, a branch pipe connected with the discharge-pipe intermediate the discharge-valve and pump and extending into the settling-tank, a pipe movably mounted in the settling-tank connected at one end with the inlet-pipe of the pump, and a float for suspending the opposite end of such movable pipe in the liquid of the settling-tank, substantially as described.

GEORGE M. DAVIDSON.

Witnesses:
THOMAS F. SHERIDAN,
HARRY IRWIN CROMER.